(12) United States Patent
Shao et al.

(10) Patent No.: US 11,898,895 B2
(45) Date of Patent: Feb. 13, 2024

(54) METHODS AND SYSTEMS FOR NATURAL GAS DATA COMPUTATION OUTSIDE GAS INTERNET OF THINGS BASED ON ENERGY MEASURING

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Bin Liu, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 79 days.

(21) Appl. No.: 17/804,088

(22) Filed: May 25, 2022

(65) Prior Publication Data

US 2023/0027479 A1 Jan. 26, 2023

(30) Foreign Application Priority Data

Jul. 26, 2021 (CN) .......................... 202110844484.8
Apr. 14, 2022 (CN) .......................... 202210388235.7

(51) Int. Cl.
*G01F 25/10* (2022.01)
*G01F 1/34* (2006.01)
(Continued)

(52) U.S. Cl.
CPC ............... *G01F 25/15* (2022.01); *G01F 1/34* (2013.01); *G06Q 50/06* (2013.01); *G16Y 10/35* (2020.01); *G01D 2204/30* (2021.05)

(58) Field of Classification Search
USPC .......................................................... 702/47
See application file for complete search history.

(56) References Cited

U.S. PATENT DOCUMENTS

| 11,187,566 B2* | 11/2021 | Arunachalam | ......... H04W 4/38 |
| 2013/0066477 A1* | 3/2013 | Jiang | ................... H04L 41/0833 |
| | | | 700/291 |

(Continued)

FOREIGN PATENT DOCUMENTS

| CN | 105678997 A | 6/2016 |
| CN | 108470239 A | 8/2018 |

(Continued)

OTHER PUBLICATIONS

First Office Action in Chinese Application No. 202110844484.8 dated Apr. 22, 2023, 15 pages.

(Continued)

*Primary Examiner* — Paul D Lee
(74) *Attorney, Agent, or Firm* — METIS IP LLC

(57) ABSTRACT

The embodiments of the present disclosure provide methods and systems for natural gas data computation outside a gas IoT based on energy measuring, including establishing the gas IoT. The object platform obtains consumed gas volume data and location data of the smart gas meter as first data and second data, and sending them to the management platform through the sensor network platform. The management platform generates consumed gas preprocessing data based on the first data and the second data, and generates energy measurement data after performing the computation outside the gas IoT on the consumed gas preprocessing data by the cloud platform outside the gas IoT. The management platform sends the energy measurement data to the user platform configured in a regional pipeline network center through the service platform. The user platform performs gas energy measurement of the smart gas meter based on the energy measurement data.

4 Claims, 11 Drawing Sheets

(51) Int. Cl.
*G06Q 50/06* (2012.01)
*G16Y 10/35* (2020.01)

(56) References Cited

U.S. PATENT DOCUMENTS

| | | | | |
|---|---|---|---|---|
| 2016/0010445 | A1* | 1/2016 | Harrison | G05B 19/406 |
| | | | | 702/6 |
| 2018/0284758 | A1* | 10/2018 | Cella | G05B 23/0264 |
| 2019/0339688 | A1* | 11/2019 | Cella | H04L 1/18 |
| 2019/0368916 | A1* | 12/2019 | Al-Abdulwahed | G01F 25/10 |
| 2020/0286351 | A1* | 9/2020 | Corcoran | H04L 12/2825 |
| 2021/0334913 | A1* | 10/2021 | Klein | G01F 15/06 |

FOREIGN PATENT DOCUMENTS

| | | |
|---|---|---|
| CN | 111781884 A | 10/2020 |
| CN | 112946231 A | 6/2021 |
| CN | 113141545 A | 7/2021 |
| WO | 2019200662 A1 | 10/2019 |

OTHER PUBLICATIONS

Notification to Grant Patent Right for Invention in Chinese Application No. 202110844484.8 dated May 9, 2023, 6 pages.

* cited by examiner

Establishing the user platform B and the object platform B in the management platform A, and establishing the service platform B, the management platform B, and the sensor network platform B on the cloud platform outside the gas IoT; the user platform B, the service platform B, the management platform B, the sensor network platform B, and the object platform B interact in turn.

METHODS AND SYSTEMS FOR NATURAL GAS DATA COMPUTATION OUTSIDE GAS INTERNET OF THINGS BASED ON ENERGY MEASURING

CROSS-REFERENCE TO RELATED APPLICATIONS

This application claims priority of Chinese Patent Application No. 202110844484.8, filed on Jul. 26, 2021, and priority of Chinese Patent Application No. 202210388235.7, filed on Apr. 14, 2022, the entire contents of which are incorporated herein by reference.

TECHNICAL FIELD

The present disclosure relates to the technical field of the Internet of Things (IoT), and in particular, to methods and systems for natural gas data computation outside gas IoT based on energy measuring.

BACKGROUND

At present, natural gas measuring in China still takes a volume measurement method, while the energy measurement method is used in the International natural gas trade and consumption. The measurement of natural gas by energy may ensure the quality of natural gas, achieve value-based pricing, ensure the fairness of the price of different natural gas used by users, reflect the core value of natural gas as a fuel, and reduce the contradiction between supply and demand in natural gas transactions. With the formation of the multi-source gas supply pattern of natural gas in urban and the acceleration of global economic integration, measuring by energy has become an inevitable trend of natural gas measuring and settlement in China.

According to the national standard GB/T22723-2008 of "Determination of natural gas energy", natural gas energy measurement refers to measurement of the natural gas passing through an interface within a period of time. Determining the calorific value of the gas is one of the main features and key of the natural gas energy measuring system. At present, the main means of measuring natural gas energy is to continuously measure online by chromatography based on composition analysis. Although the accuracy of the chromatograph is high, the cost is high, so it is often only disposed in the key department to detect the calorific value of gas, such as the main supply line of each gas supply, or regional gas supply center. This arrangement may be reduced cost, but because some gas supply sources of gas pipelines are complicated, it is difficult to obtain accurate a calorific value of the gas entering the household.

SUMMARY

One of the embodiments of the present disclosure provides a method for natural gas data computation outside a gas Internet of Things (IoT) based on energy measuring. The method includes establishing the gas IoT, the gas IoT including a user platform, a service platform, a management platform, a sensor network platform, and an object platform that sequentially interacts; obtaining, by the object platform, consumed gas volume data of a smart gas meter as first data, and sending it to the management platform through the sensor network platform; obtaining, by the object platform, location data of the smart gas meter as second data, and sending it to the management platform through the sensor network platform; perceiving, by the sensor network platform, the consumed gas volume data of the smart gas meter obtained by the object platform as the first data and sending, by the sensor network platform, the consumed gas volume data to the management platform; perceiving, by the sensor network platform, the location data of the smart gas meter obtained by the object platform as the second data and sending, by the sensor network platform, the location data to the management platform; wherein the management platform is set on a cloud platform to form a cloud platform in the gas IoT; a plurality of the cloud platforms in the gas IoT interact with at least one cloud platform outside the gas IoT; and computation outside the gas IoT is performed through the cloud platform outside the gas IoT; generating, by the management platform, consumed gas preprocessing data based on the first data and the second data, and generating energy measurement data after performing the computation outside the gas IoT on the consumed gas preprocessing data by the cloud platform outside the gas IoT; sending, by the management platform, the energy measurement data to the user platform configured in a regional pipeline network center through the service platform; performing, by the user platform, gas energy measurement of the smart gas meter based on the energy measurement data.

The embodiments of the present disclosure provide a system for natural gas data computation outside a gas Internet of Things (IoT) based on energy measuring. The system includes the gas IoT, the gas IoT including a user platform, a service platform, a management platform, a sensor network platform, and an object platform that sequentially interacts; wherein the object platform obtains consumed gas volume data of a smart gas meter as first data, and sends it to the management platform through the sensor network platform; the object platform obtains location data of the smart gas meter as second data, and sends it to the management platform through the sensor network platform; the management platform is set on a cloud platform to form a cloud platform in the gas IoT; a plurality of the cloud platforms in the gas IoT interact with at least one cloud platform outside the gas IoT; and computation outside the gas IoT is performed through the cloud platform outside the gas IoT; the management platform generates consumed gas preprocessing data based on the first data and the second data, and generates energy measurement data after performing the computation outside the gas IoT on the consumed gas preprocessing data by the cloud platform outside the gas IoT; the management platform sends the energy measurement data to the user platform configured in a regional pipeline network center through the service platform; and the user platform performs gas energy measurement of the smart gas meter based on the energy measurement data.

Some embodiments of the present disclosure provides a computer-readable storage medium. The computer-readable storage medium storing computer instructions, wherein when reading the computer instructions in the storage medium, a computer implements the method for natural gas data computation outside the gas IoT based on energy measuring.

The present disclosure has the following advantages and beneficial effects compared to prior art:

the present disclosure is based on methods and systems for natural gas data computation outside the gas IoT based on energy measuring, providing a strong computing resource to the gas IoT, the calculation process of complex measuring data is completed on the cloud platform outside the gas IoT. However, the calculation involving sensitive data with less workload is completed on the cloud platform in the gas IoT, so that the energy measuring data of each gas measurement may also be effectively obtained for the gas pipeline network with multiple gas supply sources.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a flowchart illustrating an exemplary process for completing computing outside the network through cloud platform outside the gas IoT according to other embodiments of the present disclosure;

DETAILED DESCRIPTION

Figure 1:
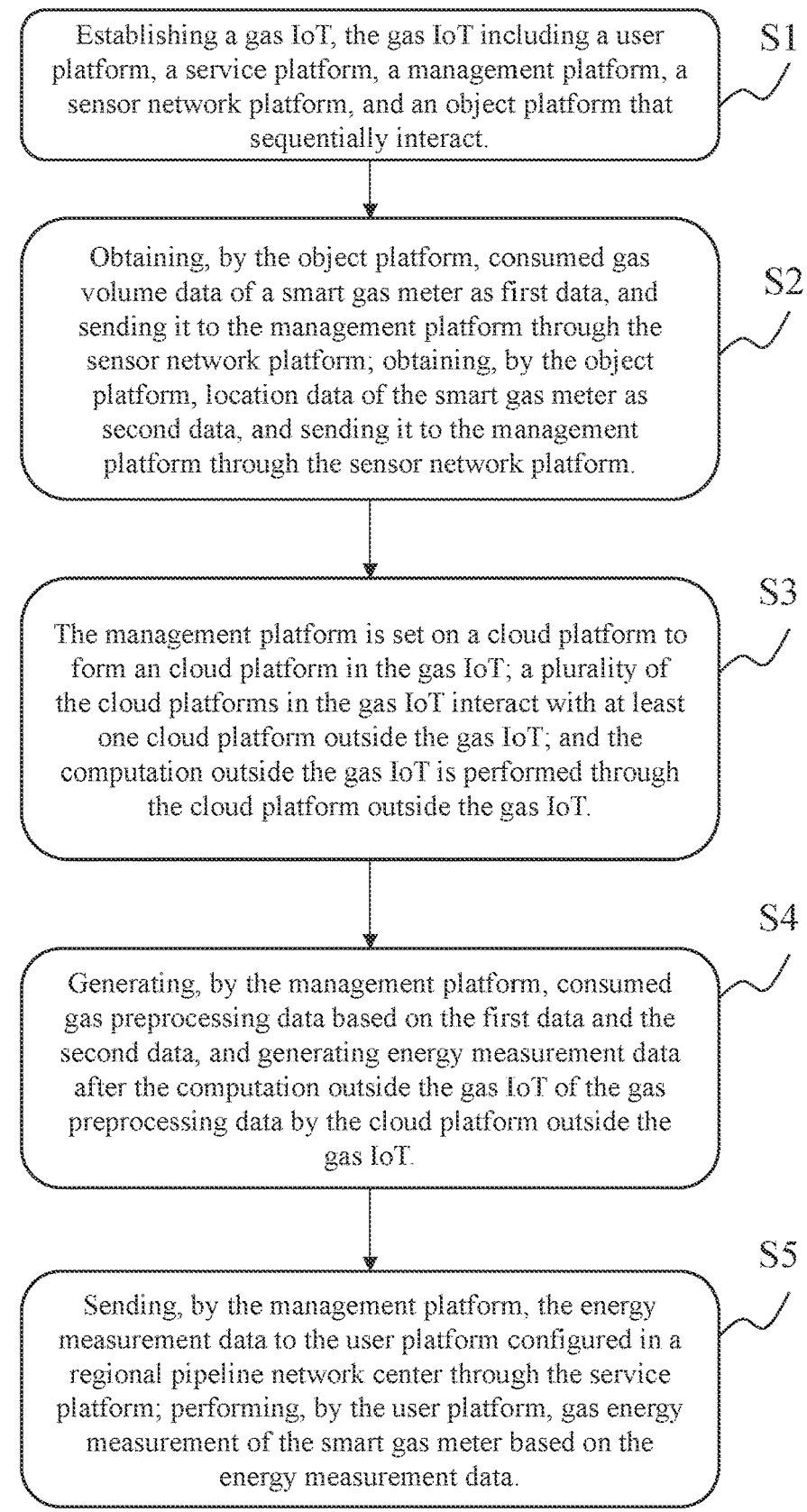
FIG. 1 is a flowchart illustrating an exemplary process for natural gas data computation outside gas IoT based on energy measuring according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 4:
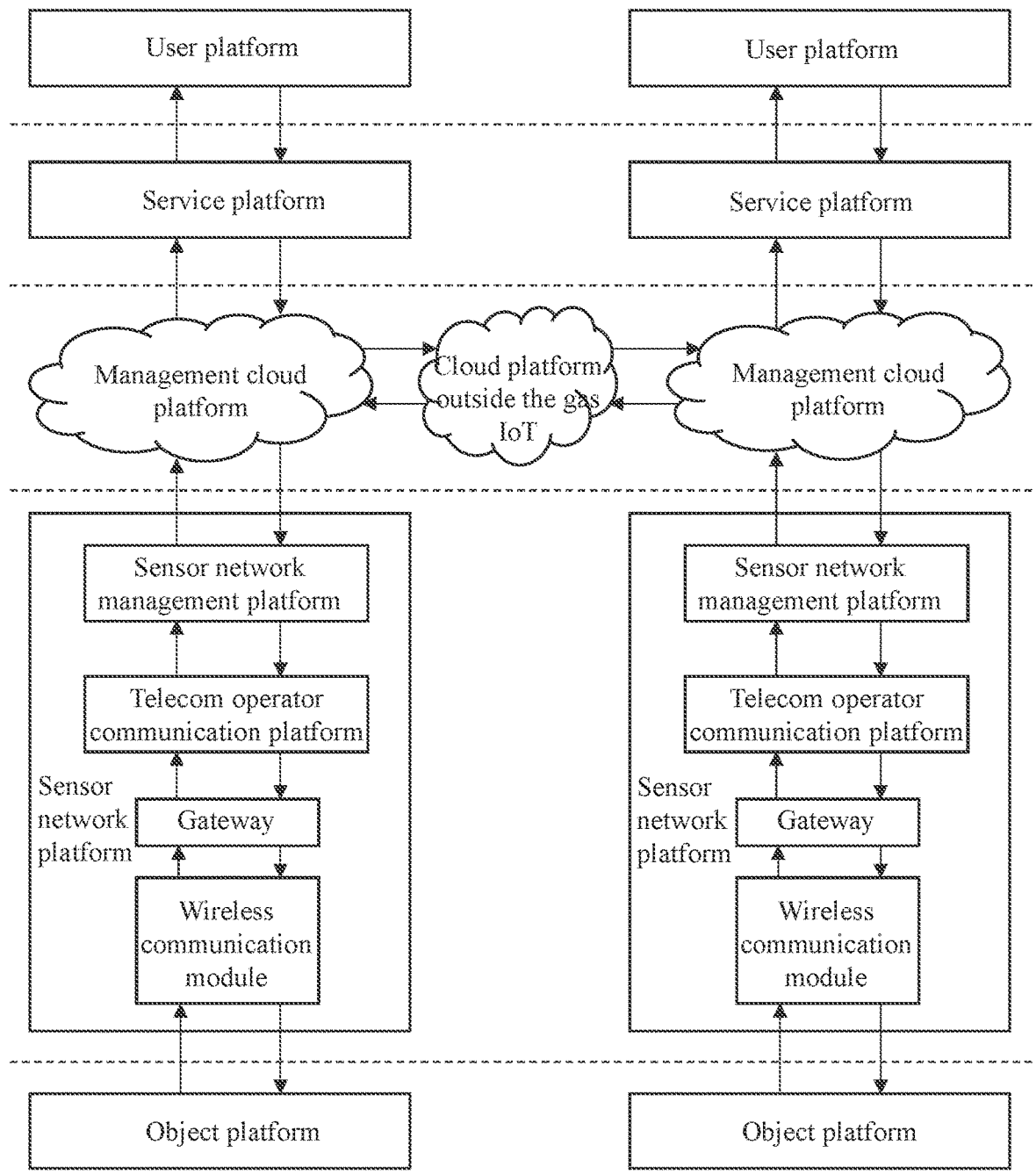
FIG. 4 is a schematic diagram of systems for natural gas data computation outside gas IoT based on energy measuring according to some embodiments of the present disclosure.

In order to facilitate the presence of the above-described methods for natural gas data computation outside gas IoT based on energy measuring, please refer to FIG. 1, which is a flowchart illustrating an exemplary process for natural gas data computation outside gas IoT based on energy measuring according to some embodiments of the present disclosure, and the methods for natural gas data computation outside gas IoT based on energy measuring may be applied to FIG. 4. Further, the methods for natural gas data computation outside gas IoT based on energy measuring may include the following step S1-step S5 as described:

S1: establishing a gas IoT; the gas IoT includes a user platform, a service platform, a management platform, a sensor network platform, and an object platform that sequentially interacts;

S2: the object platform obtains the consumed gas volume data of the smart gas meter as the first data, and sends it to the management platform through the sensor network platform; the object platform obtains the location data of the smart gas meter as the second data, and sends it to the management platform through the sensor network platform;

S3: the management platform is set on the cloud platform to form a cloud platform in the gas IoT; a plurality of the cloud platforms in the gas IoT also interact with at least one cloud platform outside the gas IoT, and complete computation outside gas IoT through the cloud platform outside the gas IoT;

S4: the management platform generates consumed gas preprocessing data based on the first data and the second data, and the consumed gas preprocessing data is used to generate energy measurement data by computing outside gas IoT through the cloud platform outside the gas IoT;

S5: the management platform sends the energy measurement data to the user platform configured in the regional pipeline network center through the service platform; the user platform performs the gas energy measurement of the smart gas meter based on the energy measurement data.

In one of embodiments of the present disclosure, the object platform is used to sense two sets of data of the smart gas meter, wherein the first data is the consumed gas volume data of the smart gas meter, which is detected by the existing gas meters, and may be obtained by a thin-film sensor, an ultrasonic sensor, or the like; the second data is the location data of the smart gas meter. In the current gas system, each smart gas meter has its corresponding number, geographical location information, and position in the gas supply and gas distribution topology. In this embodiment, the second data includes the above numbers, geographical location information, and the position in the gas supply and gas distribution topology.

In one of embodiments of the present disclosure, the management platform is configured on the cloud platform in the gas IoT, forming a private cloud, and some sensitive data may be stored on the private cloud such as the pipeline network topology data in an area. However, as the private cloud at the same time, the computing resources of the cloud platform in the gas IoT itself are not rich, the cloud platform in the gas IoT also needs to participate in the daily calculation work of some management platforms. Therefore, in this embodiment, a cloud platform outside the gas IoT is used to perform large-scale data computing work.

On the cloud platform in the gas IoT, the management platform completes the preprocessing of the first data and the second data, and its preprocessing work is mainly to complete data encoding conversion and process the first data and the second data with some sensitive data stored in the private cloud, and these sensitive data is for data security considerations that cannot be sent directly to the cloud platform outside the gas IoT, so this part of the content requires the platform in the gas IoT to calculate. However, on the cloud platform outside the gas IoT, it is necessary to complete the generation of energy measuring data according to the gas preprocessing data, and the energy measurement data is used as statistical data of each gas meter in a regional pipeline network center. In this way, the strong computing resources may be provided by the gas IoT through this method, the calculation process of complex measurement data is placed on the cloud platform outside the gas IoT, and the calculation of the small workload involved in sensitive data is put on the cloud platform in the gas IoT, so that the energy measuring data of each gas meter may also be effectively obtained for the gas pipeline network with a plurality of gas supply sources.

Figure 2:
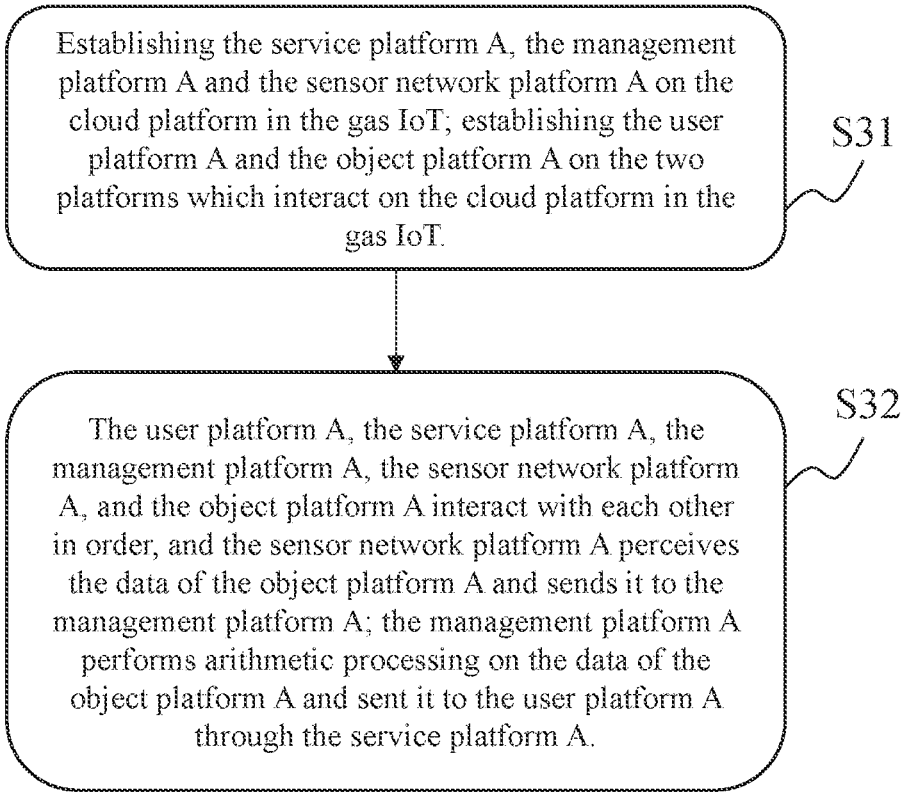
FIG. 2 is a flowchart illustrating an exemplary process for completing computation outside gas IoT through cloud platform outside the gas IoT according to some embodiments of the present disclosure.

In one of embodiments of the present disclosure, please refer to FIG. 2, and the step S3 includes the following steps:

S31: establishing the service platform A, the management platform A and the sensor network platform A on the cloud platform in the gas IoT; establishing the user platform A and the object platform A on the two platforms which interact on the cloud platform in the gas IoT;

S32: the user platform A, the service platform A, the management platform A, the sensor network platform A, and the object platform A interact with each other in order, and the sensor network platform A perceives the data of the object platform A and sends it to the management platform A; the management platform A performs computation processing on the data of the object platform A and sent it to the user platform A through the service platform A.

In one of embodiments of the present disclosure, please refer to FIG. 3, and the step S3 also includes the following steps:

S33: establishing the user platform B and the object platform B in the management platform A, and establishing the service platform B, the management platform B, and the sensor network platform B on the cloud platform outside the gas IoT; the user platform B, the service platform B, the management platform B, the sensor network platform B, and the object platform B interact in turn.

In one of embodiments of the present disclosure, the management platform A includes the topology data of the local gas transmission and distribution pipeline network (also referred to as pipeline network topology data); the management platform A obtains the number of gas sources in the local gas transmission and distribution pipeline network corresponding to the second data according to the second data.

When the number of gas sources is greater than one, the management platform A obtains the gas supply pressure of each gas source corresponding to the second data as a first energy parameter and obtains the calorific value of each gas source corresponding to the second data as a second energy parameter; the management platform A is further configured to obtain, from the topology data of the local gas transmission and distribution pipeline network, the gas transmission topology data of each gas source corresponding to the second data reaching the smart gas meter corresponding to the second data as a third energy parameter.

The management platform A sends the first energy parameter, the second energy parameter, and the third energy parameter to the management platform B through the sensor network platform B; the management platform B obtains the first energy measurement data by computing the first data based on the first energy parameter, the second energy parameter, and the third energy parameter, and sends it to the management platform A through the service platform B.

The management platform A generates energy measurement data by processing the first energy measurement data.

When the embodiment is implemented, the topology data of the local gas transmission and distribution pipeline network is sensitive data, so it must be configured on the private cloud, that is set on the cloud platform in the gas IoT. First, it is necessary to obtain the number of gas sources that may directly supply gas to the gas meter corresponding to the second data from the topology data of the local gas transmission and distribution pipeline network. If there is one gas source, then the calorific value of this gas source may be used to directly measure the energy of the gas meter. If the number of gas sources are two or more, then the following steps need to be taken for accurate gas energy measurement.

The management platform A as the core of the cloud platform in the gas IoT needs to obtain the gas supply pressure of each gas source since the gas supply pressure directly affects the gas supply of the gas source to each gas meter, at the same time, it is also necessary to obtain the calorific value of each gas source to facilitate energy measurement. The inventor also found that with the extension of the gas supply pipeline, the pressure of gas supply may also be attenuated, and the contribution of the gas source to the gas meter after the pressure attenuation may also change. Therefore, through the management platform A, it is also necessary to obtain the gas transmission topology data of each gas source reaching the smart gas meter corresponding to the second data, the gas transmission topology data here mainly includes the nodes in the topology and the distances between the nodes. Through the gas transmission topology data, different branch lengths and nodes passed by the branch may be obtained.

In the implementation of this embodiment, the cloud platform outside the gas IoT needs to perform large-scale computing tasks, the computing process mainly includes the calculation of the first energy measurement data through the first energy parameter, the second energy parameter, and the third energy parameter. In the calculation process, the contribution of each gas source may be evaluated, through the third energy parameter, by attenuating each factor in the first energy parameter, or the third parameter and the first energy parameter may be integrated by means of weighted calculation.

In a more specific embodiment, the management platform A processes the first energy measurement data to generate energy measurement data, and the processing process mainly includes the following steps.

Summarize a plurality of first energy measurement data into a sample library, and use the second data as a classification basis to classify the sample library to generate a plurality of energy measurement classification databases.

When receiving new second data, traverse a plurality of energy measurement classification databases; if an energy measurement classification database that matches the new second data is found, a calorific value corresponding to the energy measurement classification database is directly used as the matching data of the new second data to generate energy measurement data corresponding to the new second data.

In a more specific embodiment, the management platform B extracts a length of each branch from each gas source to the smart gas meter corresponding to the second data from the third energy parameter, and removes the branch whose length is greater than the preset value to form a gas supply length factor for each gas source.

The management platform B obtains a gas supply contribution value of each gas source contributing to the smart gas meter as the first weight data according to the first energy parameter and the gas supply length factor matching the first energy parameter.

The management platform B uses the first weight data as the weight to perform the regression operation on the second energy parameter to generate a measuring heating parameter.

The management platform B multiplies the measuring heating parameter with the first data to form the first energy measurement data.

When the embodiment is implemented, the length of a branch greater than the preset value may be first eliminated to reduce data redundancy, and each gas source may have a plurality of branches connecting to the same gas meter, so each branch generally needs to be evaluated separately. By evaluating each branch, the gas supply contribution of each branch to the gas meter may be obtained, and then the branch data of the same gas source may be combined to obtain the gas supply contribution value of each gas source contributing to the gas meter as the first weight data.

After the first weight data is used as the weight to perform the regression operation on the second energy parameter, the calorific value at the gas meter may be formed as the measured heating parameter. At this time, the measuring heating parameter may be multiplied by the first data to form accurate first energy measurement data.

Based on the same invention idea, refer to FIG. 4, and the present disclosure embodiment also provides systems for natural gas data computation outside gas IoT based on energy measuring, comprising: the gas IoT.

The gas IoT includes a user platform, a service platform, a management platform, a sensor network platform, and an object platform that sequentially interacts.

The object platform obtains consumed gas volume data of a smart gas meter as first data, and sends it to the management platform through the sensor network platform; the object platform obtains location data of the smart gas meter as second data, and sends it to the management platform through the sensor network platform.

The management platform is set on a cloud platform to form a cloud platform in the gas IoT; a plurality of the cloud platforms in the gas IoT interact with at least one cloud platform outside the gas IoT; and computation outside the gas IoT is performed through the cloud platform outside the gas IoT.

The management platform generates consumed gas preprocessing data based on the first data and the second data, and generates energy measurement data after performing the computation outside the gas IoT on the consumed gas preprocessing data by the cloud platform outside the gas IoT.

The management platform sends the energy measurement data to the user platform configured in a regional pipeline network center through the service platform; and the user platform performs gas energy measurement of the smart gas meter based on the energy measurement data.

Figure 5:
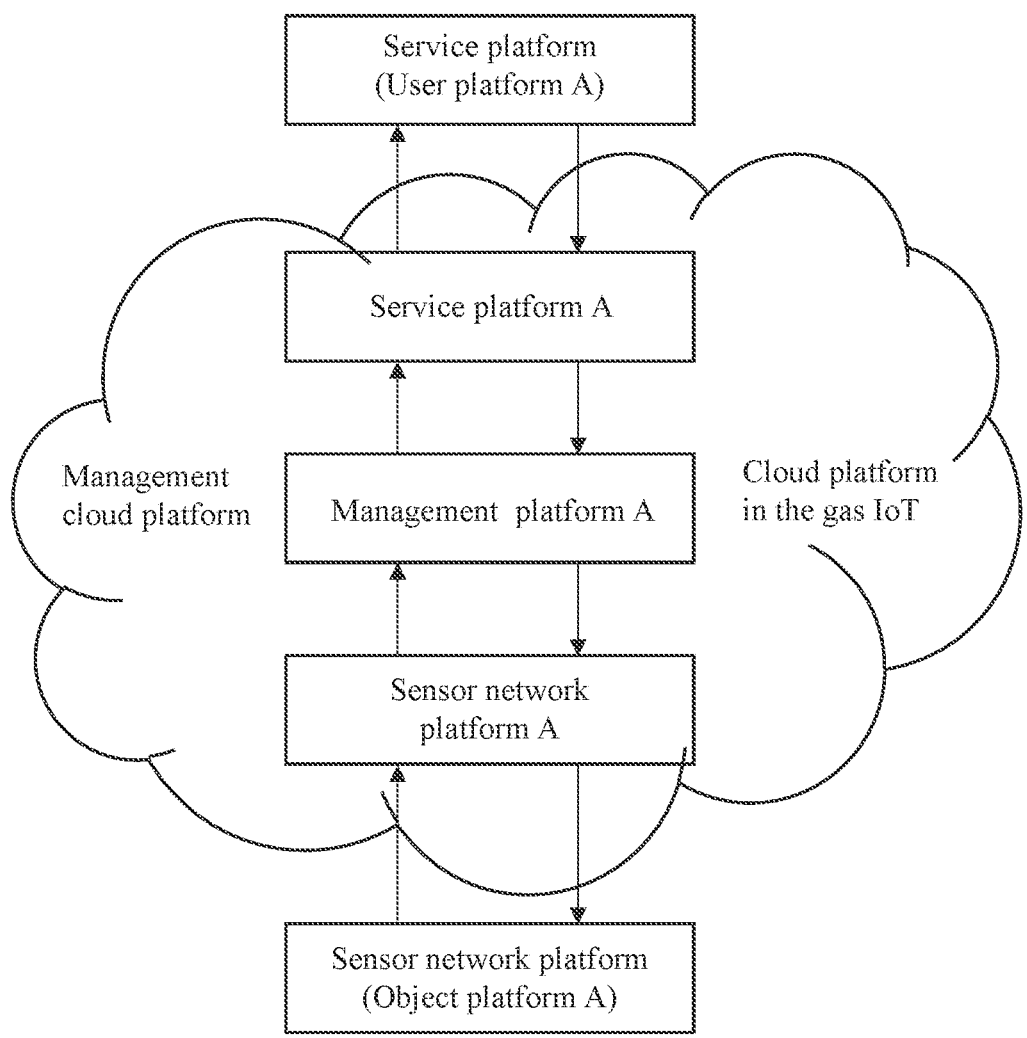
FIG. 5 is a schematic diagram for systems of the gas IoT according to some embodiments of the present disclosure.

In one of embodiments of the present disclosure, refer to FIG. 5, the service platform A, the management platform A and the sensor network platform A are established on the cloud platform in the gas IoT; the user platform A and the object platform A are established on the two platforms interacting with the cloud platform in the gas IoT.

The user platform A, the service platform A, the management platform A, the sensor network platform A, and the object platform A interact in order, and the sensor network platform A perceives the data of the object platform A and sends it to the management platform A. The management platform A performs computation processing on the data of the object platform A and sent it to the user platform A through the service platform A.

Figure 6:
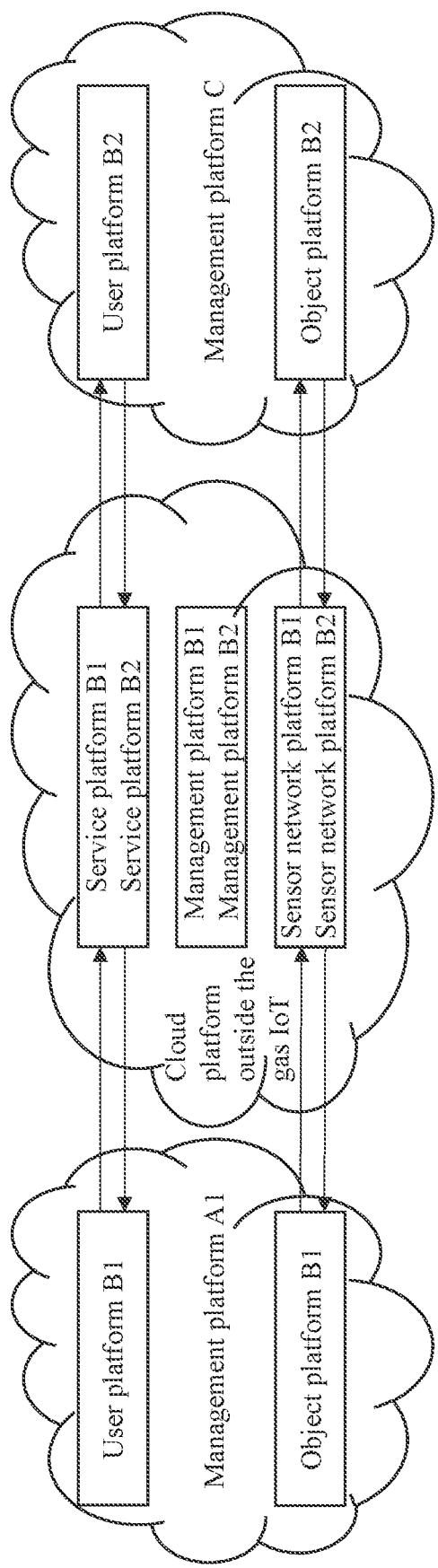
FIG. 6 is a schematic diagram for systems of the gas IoT according to other embodiments of the present disclosure.

In one of embodiments of the present disclosure, refer to FIG. 6, the user platform B and the object platform B are established on the management platform A, and the service platform B, the management platform B, and the sensor network platform B are established on the cloud platform outside the gas IoT. The user platform B, the service platform B, the management platform B, the sensor network platform B, and the object platform B interact in turn.

A more specific implementation is also shown in FIG. 6, and the management platform A1 and the management platform C are all cloud platforms in the gas IoT interacting with the cloud platform outside the gas IoT. The management platform A1 interacts with the cloud platform outside the gas IoT by a process of the object platform B1→the sensor network platform B1→the management platform B1→the service platform B1→the user platform B1. Similarly, the management platform C interacts with the cloud platform outside the gas IoT by a process of the object platform B2→the sensor network platform B2→the management platform B2→the service platform B2→the user platform B2. The management platform C and the management platform A1 share the same sensor network platform, the management platform, and the service platform to achieve interaction, which is also conducive to data sharing.

In one of embodiments of the present disclosure, the management platform A sets the topology data of the local gas transmission and distribution pipeline network. The management platform A obtains the number of gas sources in the local gas transmission and distribution pipeline network corresponding to the second data according to the second data.

When the number of gas sources is greater than one, the management platform A obtains the gas supply pressure of each gas source corresponding to the second data as the first energy parameter and obtains the calorific value corresponding to the second data as the second energy parameter. The management platform A is further configured to obtain, from the topology data of the local gas transmission and distribution pipeline network, the gas transmission topology data of each gas source corresponding to the second data reaching the smart gas meter corresponding to the second data as a third energy parameter.

The management platform A sends the first energy parameter, the second energy parameter, and the third energy parameter to the management platform B through the sensor network platform B. The management platform B obtains the first energy measurement data by computing the first data based on the first energy parameter, the second energy parameter, and the third energy parameter, and sends it to the management platform A through the service platform B.

The management platform A generates energy measurement data by processing the first energy measurement data.

In one of embodiments of the present disclosure, the management platform B extracts the length of each branch from each gas source to the smart gas meter corresponding to the second data from the third energy parameter, and removes the branch whose length is greater than the preset value to form a gas supply length factor for each gas source.

The management platform B obtains the gas supply contribution value of each gas source to the smart gas meter as the first weight data according to the first energy parameter and the gas supply length factor matching the first energy parameter.

The management platform B uses the first weight data as the weight to perform a regression operation on the second energy parameter to generate a measuring heating parameter.

The management platform B multiplies the measuring heating parameter by the first data to form the first energy measurement data.

Figure 7:
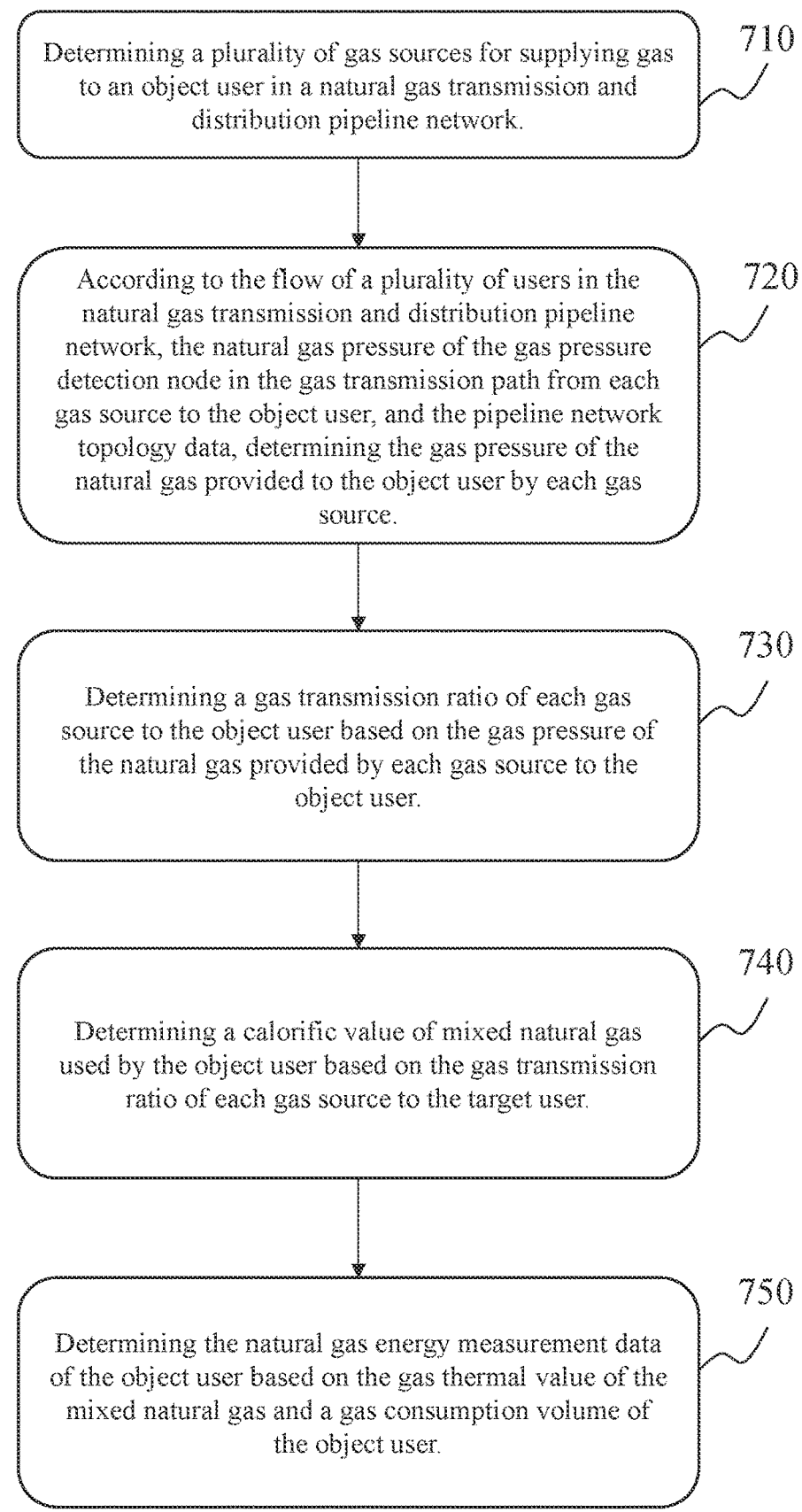
FIG. 7 is a flowchart illustrating an exemplary process for generating energy measurement data according to some embodiments of the present disclosure.

FIG. 7 is a flowchart illustrating an exemplary process for generating energy measurement data according to some embodiments of the present disclosure. Due to the complicated sources of gas supply for some gas pipelines, the intake pipes in the household may include hybrid natural gas from a plurality of gas sources, and calorific values of different gas sources (heating amount per unit volume of natural gas) may be different. While gas calorific value detection may often only be carried out in key parts (for example, gas source position), so it is difficult to obtain the calorific value of natural gas in the intake pipeline of the household, and it is difficult to accurately measure the energy consumption of the user's gas. Therefore, there is a need for a more accurate energy measuring method. As shown in FIG. 7, in some embodiments, generating energy measurement data may include the following steps.

Step 710, determining a plurality of gas sources for supply gas to an object user in a natural gas transmission and distribution pipeline network. In some embodiments, step 710 may be executed by the management platform.

The natural gas transmission and distribution pipeline network may be constructed of a plurality of nodes, and the two nodes may be connected via a natural gas pipeline. The node may be different types, for example, a gas source node for providing natural gas, a user node of using natural gas, a gas pressure detection node for detecting natural gas, a connection node for connecting two natural gas pipelines, etc. In some embodiments, step 710 may be executed by the management platform.

In one of embodiments of the present disclosure, the management platform may obtain the natural gas transmission and distribution pipeline network from the user platform, the service platform, the sensor network platform, the object platform, and/or the external data source.

The object user may be the natural gas user corresponding to the user node in the natural gas transmission and distribution pipeline network.

Figure 8:
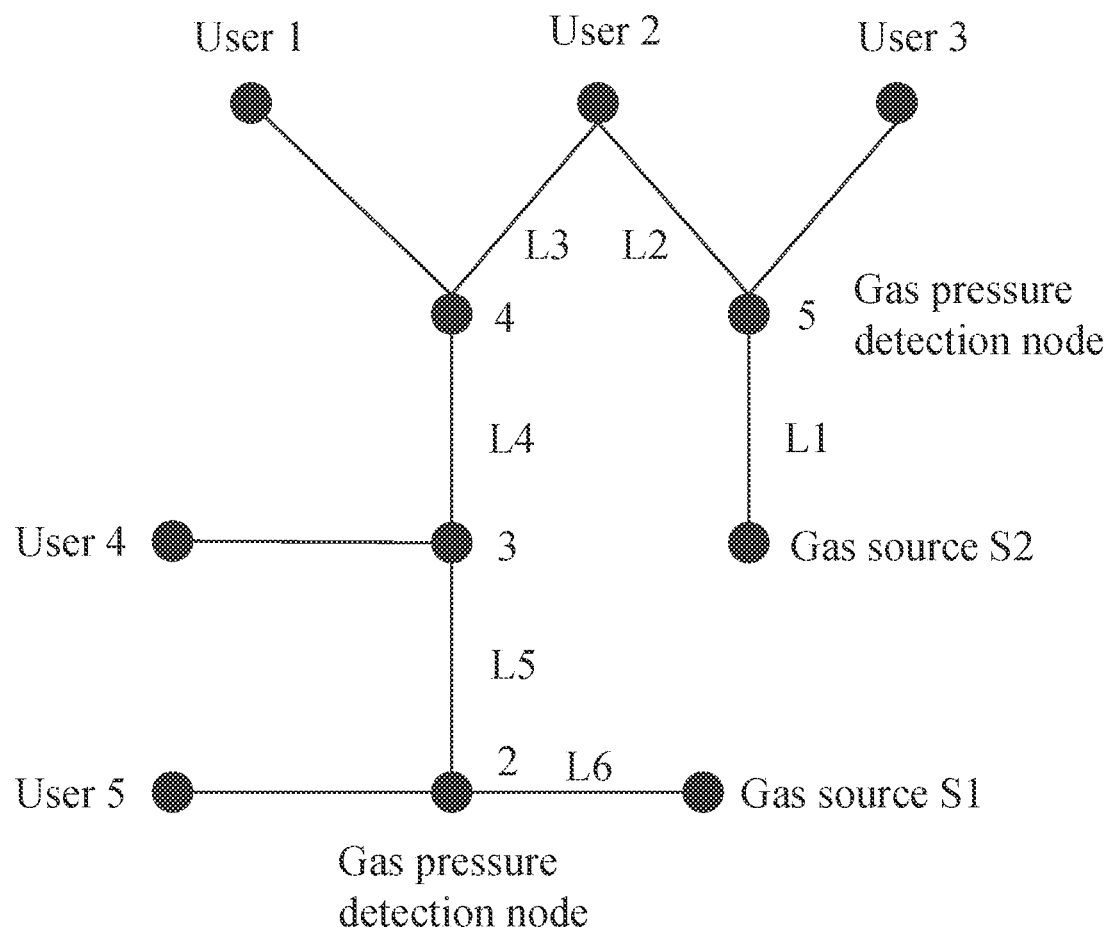
FIG. 8 is a schematic diagram for systems of natural gas transmission and distribution pipeline network according to some embodiments of the present disclosure.

In one of embodiments of the present disclosure, the management platform may determine a plurality of gas sources for supplying gas to the object user based on the natural gas transmission and distribution pipeline network. For example, the management platform may determine a plurality of gas source nodes connected to the user node corresponding to the object user according to the natural gas transmission and distribution pipeline network, and use gas sources corresponding to a plurality of gas source nodes as the plurality of gas sources for supplying gas to the object user. For example, refer to FIG. 8, for the user 2, the node corresponding to gas source S2 is connected to the node corresponding to the user 2 through natural gas pipelines L1 and L2, and the node corresponding to gas source S1 is connected to the node corresponding to the user 2 through natural gas pipelines L3, L4, L5, and L6, the management platform may determine that the gas source that supplies gas to the user 2 includes gas source S1 and gas source S2.

Step 720, according to the flow of a plurality of users in the natural gas transmission and distribution pipeline network, the natural gas pressure of the gas pressure detection node in the gas transmission route from each gas source to the object user, and the pipeline network topology data, determining the gas pressure of the natural gas provided to the object user by each gas source. In some embodiments, step 720 may be executed by the management platform.

The topology data of the pipeline network may characterize the connection relationship of each node in the natural gas transmission and distribution pipeline network. The flow of a plurality of users (or user flow) may represent flow of natural gas transmitted to the users.

In some embodiments, the management platform may be, in any way, determine the gas pressure of the natural gas provided to the object user by each gas source according to the flow of a plurality of users in the natural gas transmission and distribution pipeline network, the natural gas pressure of the gas pressure detection node in the gas transmission route from each gas source to the object user, and the pipeline network topology data. For example, according to the flow of a plurality of users in the natural gas transmission and distribution pipeline network, the natural gas pressure of the gas pressure detection node in the gas transmission route from each gas source to the object user, and the pipeline network topology data, the gas pressure of the natural gas provided to the object user by each gas source may be determined by manual.

In some embodiments, the management platform may obtain the gas pressure of the natural gas supplied by the gas source to the object user through the gas pressure prediction model, which may be a machine learning model for determining the gas pressure of the natural gas provided by the gas source to the object user. In some embodiments, for each gas source, the management platform may first determine the gas transmission route between the gas source and the object user; obtain a gas transmission feature vector of the gas transmission route according to the flow of a plurality of users in the natural gas transport network, the natural gas pressure of the object pressure detection node, and the pipeline network topology data; and obtain, through the gas pressure prediction model, the gas pressure of the natural gas supplied by the gas source to the object user based on gas transmission feature vector of the gas transmission route. The gas transmission route is a route from the object gas pressure detection node between the gas source and the object user to the object user, and the object gas pressure detection node is a gas pressure detection node closest to the object user in the communication route between the gas source and the object user. Still take FIG. 8 as an example, the gas source S2 first reaches node 5 through the natural gas pipeline L1, wherein node 5 is a gas pressure detection node, and then reaches to the node corresponding to the user 2 from node 5 through the natural gas pipeline L2. Therefore, the node 5 is the object gas pressure detection node, the route between the node 5 and the node corresponding to the user 2 (that is, the natural gas pipeline L2) is the gas transmission route.

In some embodiments, parameters of the gas pressure prediction model may be trained through a plurality of labeled training samples. In some embodiments, the management platform may obtain a plurality of training samples, and each training sample may include the gas transmission feature vector of the sample gas transmission route corresponding to a sample object user. In some embodiments, the management platform may obtain training samples from the user platform, the service platform, the sensor network platform, the object platform and/or the external data sources. The label of each training sample is the gas pressure of the natural gas provided to the object user by the gas source corresponding to the sample gas transmission route to. In some embodiments, the label of each training sample may be acquired in a variety of ways, for example, by manual labeling, for another example, from the user platform, the service platform, the sensor network platform, the object platform, and/or the external data sources.

The management platform may train the initial gas pressure prediction model through a plurality of samples and its corresponding labels until the initial gas pressure prediction model meets a preset condition to obtain a well-trained gas pressure prediction model. In some embodiments, the parameters of the initial gas pressure prediction model may be updated based on a plurality of training samples so that the initial gas pressure prediction model satisfies the preset condition. The preset condition may include that the loss function converges, the loss function value is less than the preset value, or the number of iterations is greater than the preset number, etc. When the initial gas pressure prediction model meets the preset condition, the model training is completed, and the trained gas pressure prediction model is obtained.

In some embodiments, the gas pressure prediction model may include the convolutional neural network (CNN), the recurrent neural network (RNN), the multi-layer perceptron (MLP), and the generative adversarial network (GAN), etc., or a combination thereof.

In some embodiments, by obtaining the gas transmission feature vector of the gas transmission route according to the flow of a plurality of users in the natural gas transport network, the natural gas pressure (also referred to as gas pressure of the natural gas) of the object gas pressure detection node, the pipeline network topology data and obtaining the gas pressure of the natural gas supplied by the gas source to the object user through the gas pressure prediction model based on the gas transmission feature vector of the gas transmission route, the gas pressure of the natural gas supplied to the object user by the gas source can be accurately and quickly determined.

In some embodiments, the gas transmission route may be composed of at least one natural gas pipeline, and the gas transmission feature vector of the gas transmission route may be composed of a pipeline feature vector of at least one natural gas pipeline. The pipeline feature vector may include at least one of natural gas pressure of the object gas pressure detection node, a pipeline type (for example, long-distance gas pipelines, distribution pipelines, inlet pipes, indoor gas pipelines, industrial/enterprise gas pipelines, etc.), the number of associated branches, the number of associated user nodes, and a total gas consumption amount of associated user nodes. The number of associated branches is a count of other natural gas pipelines connected to the at least one natural gas pipeline, and the number of associated user nodes is a count of user nodes connected to the at least one natural gas pipeline. In some embodiments, the pipeline feature vector also includes at least one associated user node distribution type (e.g., industrial, residential, office, etc.), gas delivery time type (e.g., rest days, working days, etc.), environmental characteristics (e.g., temperature, etc.), etc.

In some embodiments, the management platform may obtain a feature vector sequence by sorting at least one pipeline feature vector of at least one pipeline according to a gas transmission sequence, wherein the gas transmission sequence is the sequence in which natural gas is transported from the object gas pressure detection node to a natural gas pipeline through which the object user passes. Still taking FIG. 8 as an example, the user 2 is supplied with the gas source S1, and the gas transmission sequence is L5→L4→L3. Therefore, the management platform may obtain the feature vector sequence (L5, L4, L3) by sorting the pipeline feature vectors of pipelines L5, L4, and L3 according to the gas transmission sequence.

In some embodiments, the length of the feature vector sequence may be a fixed value, for example, pipeline feature vectors of 8 pipelines. When the number of pipelines included in the gas transmission route is less than 8, the management platform may fill the feature vector sequence with data to make the length of the feature vector sequence reaches the fixed value. Still take FIG. 8 as an example, for the feature vector sequence (L5, L4, L3), the management platform fills it with data so that a feature vector sequence after the length of the feature vector sequence reaches the fixed value (for example, 6) is (L5, L4, L3, 0, 0, 0).

In some embodiments, the input of the gas pressure prediction model may be the feature vector sequence, and the output of the gas pressure prediction model may include the gas pressure of the natural gas provided by the gas source to the object user.

In some embodiments, by obtaining the feature vector sequence by sorting the at least one pipeline feature vector of at least one pipeline according to the gas transmission sequence, and obtaining the gas pressure of the natural gas supplied by the gas source to the object user through the gas pressure prediction model based on the feature vector sequence, the influence of the upstream and downstream pipelines on the gas transmission of the intermediate pipeline may be considered in the prediction of the gas pressure prediction model, so that the gas pressure provided by the predicted gas source to the object user is more accurate.

In some embodiments, the management platform may obtain a measured value of gas pressure of the natural gas provided by at least one gas source to the object user, wherein the measured value is gas pressure of natural gas actually provided by the gas source to the object user. In some embodiments, the management platform may obtain the natural gas transmission and distribution pipeline network from the user platform, the service platform, the sensor network platform, the object platform, and/or the external data sources.

In some embodiments, the management platform may adjust the gas pressure of the natural gas provided by at least one gas source to the object user obtained by the gas pressure prediction model based on the measured value of gas pressure of the natural gas provided by at least one gas source to the object user. For example, the management platform may use the measured value of the gas pressure of the natural gas provided by the gas source to the object user to replace the gas pressure of the natural gas provided by the gas source to the object user obtained by the gas pressure prediction model. For another example, the management platform may use the measured value of the gas pressure of the natural gas provided by the gas source to the object user to modify a gas pressure of natural gas provided by the gas source to other object users, which is obtained by the gas pressure prediction model. Still take FIG. 8 as an example, the gas source S2 provides natural gas to users 2 and 3. When a measured value of the gas pressure of the natural gas provided by the gas source to the user 2 is greater than a gas pressure of the natural gas provided by the gas source to the user 2 obtained by the gas pressure prediction model, the management platform may increase a gas pressure of natural gas provided by the gas source to the user 3 obtained by the gas pressure prediction model. For example, the management platform may determine the adjustment value of the gas pressure of the natural gas provided by the gas source to the user 3 obtained by adjusting the gas pressure prediction model according to the following formula:

an adjustment value of the gas pressure of the natural gas provided by the gas source S2 to the user 3=an adjustment value of a predictive value of gas pressure of the natural gas provided by the gas source S2 to the user 2/($a$*the number of users);

wherein a is the preset coefficient, and the adjustment value of a predictive value of gas pressure of the natural gas provided by the gas source S2 to the user 2=the measured value of gas pressure of the natural gas provided by the gas source S2 to the user 2−gas pressure of the natural gas provided by the gas source S2 to the user 2 obtained by a gas pressure prediction model, and the number of users is the total number of users receiving the natural gas provided by the gas source S2.

In some embodiments, by adjusting the gas pressure of the natural gas provided by at least one gas source to the object user obtained by the gas pressure prediction model based on the measured value of gas pressure of the natural gas provided by at least one gas source to the object user, the determined gas transmission ratio of each gas source to the object user is more accurate based on the gas pressure of natural gas provided to the object user by multiple gas sources, thereby making the natural gas energy measurement data of the object user more accurate.

In some embodiments, the management platform may determine a risk of failure (also referred to as failure risk) of the gas source based on the measured value of the gas pressure of the natural gas and the gas pressure of the natural gas supplied by the gas source to the object user obtained by the gas pressure prediction model. For example, when the difference between the measured value of the gas pressure of the natural gas and the gas pressure of the natural gas supplied by the gas source to the object user obtained by the gas pressure prediction model is greater than the preset difference threshold, the management platform may determine that the gas source and/or the natural gas pipeline between the gas source and the object user is faulty. It is understood that the greater the difference between the measured value of the natural gas pressure of the gas source and the gas pressure of the natural gas provided to the object user by the gas source obtained by the gas pressure prediction model, the greater the risk of failure of the gas source.

Figure 9:
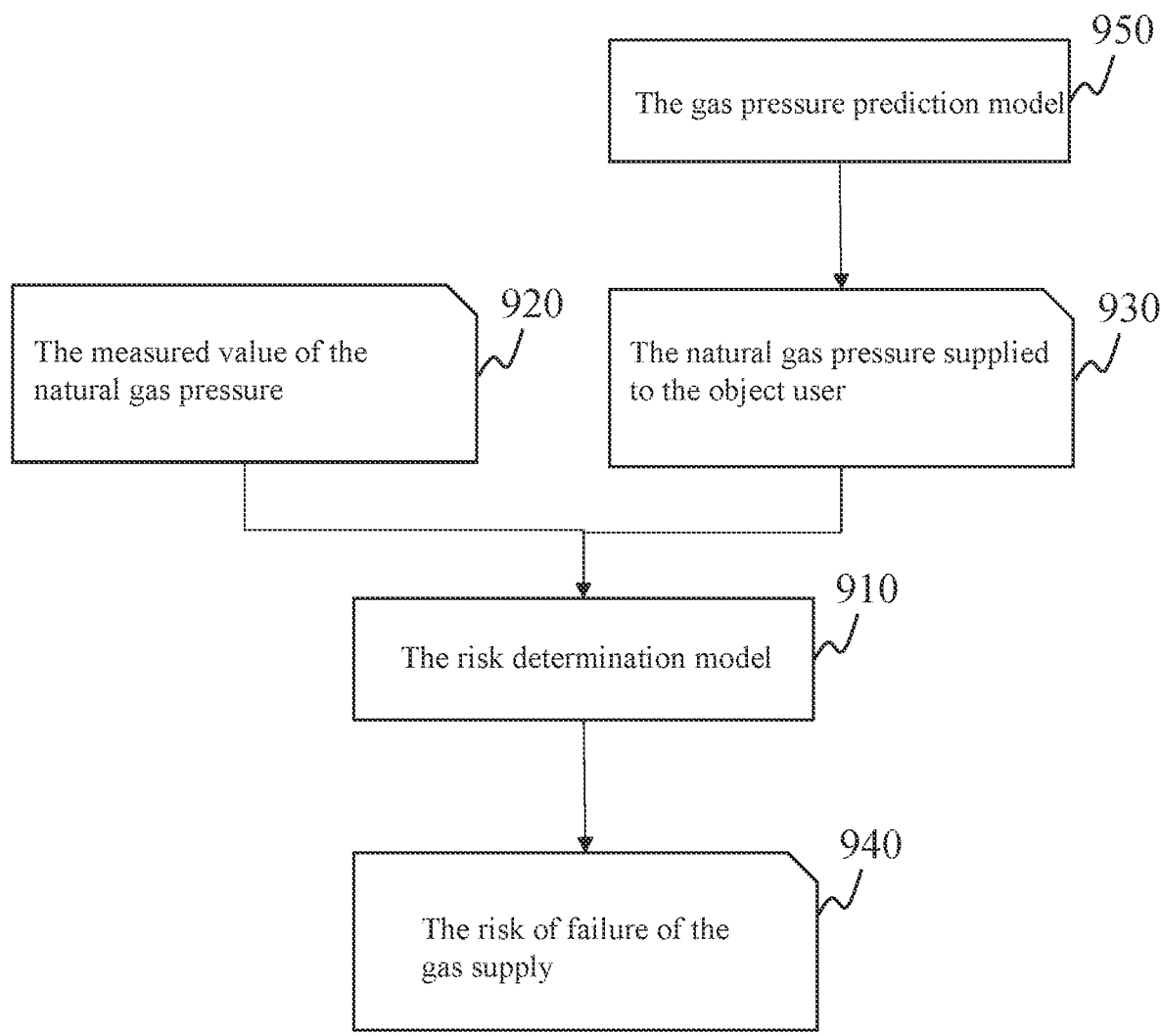
FIG. 9 is a schematic diagram for systems for determining the risk of failure of the gas source by means of a risk determination model according to some embodiments of the present disclosure.

Referring to FIG. 9, in some embodiments, the management platform may determine the failure risk 940 of the gas source through the risk determination model 910 based on the measured value 920 of the gas pressure of the natural gas of the gas source and the gas pressure 930 of the natural gas provided to the object user by the gas source obtained through the gas pressure prediction model 950. Risk determination model 910 is a machine learning model for determining the risk of failure of the gas source. The input of the risk determination model 910 is the measured value 920 of the gas pressure of the natural gas of the gas source and the gas pressure 930 of the natural gas provided by the gas source to the object user obtained through the gas pressure prediction model 950, the output of the risk determination model 910 may be the failure risk 940 of the gas source, wherein the failure risk 940 of the gas source may be in any form. For example, the failure risk 940 of the gas source may be represented by an integer between 0 and 10, the larger the value, the greater the risk. The training and structure of the risk determination model are similar to that of the gas pressure prediction model. For more description of the risk determination model, please refer to the relevant description of the gas pressure prediction model, which may not be repeated here. It is worth noting that the sample data used to train the risk determination model includes the measured value of the gas pressure of the natural gas of the sample gas source and the gas pressure of the natural gas provided to the object user by the sample gas source obtained through the gas pressure prediction model, a label of the sample data is a failure risk of the sample gas source. In some embodiments, the labels of the sample data may be obtained by any means, for example, manual labeling.

In some embodiments, by determining the failure risk of the gas source based on the measured value of the gas pressure of the natural gas of the gas source and the gas pressure of the natural gas provided to the object user by the gas source obtained through the gas pressure prediction model, an operator can be effectively reminded to repair the gas source and/or the natural gas pipeline between the gas source and the object user.

Step 730, determining a gas transmission ratio of each gas source to the object user based on the gas pressure of the natural gas provided by each gas source to the object user. In some embodiments, step 730 may be executed by the management platform.

In some embodiments, the management platform may directly determine a gas transmission ratio of each gas source to the object user based on the gas pressure of the natural gas provided by each gas source to the object user. For example, the management platform may determine the gas transmission ratio of each gas source to the object user based on the ratio of the gas pressure of the natural gas provided to the object user by each gas source to a total gas pressure. For example, the gas pressure of the natural gas provided to the object user by gas source 1 is 0.02 MPa, the gas pressure of the natural gas provided to the object user by gas source 2 is 0.01 MPa, and the gas pressure of the natural gas provided to the object user by gas source is 0.02 MPa, and thus the gas transmission ratio of the gas source 1 providing the gas to object user is determined by 0.02/(0.02+ 0.01+0.02)=0.4.

In some embodiments, the management platform may determine the gas transmission ratio of each gas source to the object user based on the gas pressure of the natural gas provided by each gas source to the object user and a diameter of a gas transmission route corresponding to each gas source. For example, the larger the gas pressure of the natural gas provided by the gas source to the object user, the larger the diameter of the gas transmission route corresponding to the gas source, and the larger the gas transmission ratio of the gas source to the object user. If the gas transmission route corresponding to each gas source is composed of a plurality of natural gas pipelines, the diameter of the gas transmission route corresponding to each gas source is an average value of the diameters of the plurality of natural gas pipelines.

In some embodiments, the management platform may use the following formula to determine the gas transmission ratio of each gas source to the object user based on the gas pressure of the natural gas provided by each gas source to the object user and the diameter of the gas transmission route corresponding to each gas source:

$$A_n = \frac{P_n/D_n}{\sum_{i=1}^{m}\left(\frac{P_i}{D_i}\right)};$$

where $A_n$ is a gas transmission ratio of the n-th gas source, $P_n$ is the gas pressure of the natural gas provided by the n-th gas source to the object user, $D_n$ is the diameter of the gas transmission route corresponding to the n-th gas source, m is the total number of gas sources supplying natural gas to object user, $P_i$ is the gas pressure of the natural gas that the i-th gas source supplied to the object user, and $D_i$ is the diameter of the gas transmission route corresponding to the i-th gas source.

In some embodiments, by determining the gas transmission ratio of each gas source to the object user based on the gas pressure of the natural gas provided to the object user by each gas source and the diameter of the gas transmission route corresponding to each gas source, the gas transmission ratio of each gas source to the object user can be determined more accurate.

Step 740, determining a calorific value of mixed natural gas used by the object user based on the gas transmission ratio of each gas source to the object user. In some embodiments, step 740 may be executed by the management platform.

In some embodiments, the management platform may determine the calorific value of mixed natural gas used by the object user based on the gas transmission ratio of each gas source to the object user. The calorific value of each gas source refers to the amount of heat that the natural gas provided by the gas source may release by burning a unit volume or mass of gas. In some embodiments, the management platform may determine the calorific value of the mixed natural gas used by the object user based on the gas transmission ratio of each gas source to the object user and the calorific value of each gas source through the following formula:

$$Q=\sum_{i=1}^{m}Q_i*A_i;$$

where Q is the calorific value of the mixed natural gas used by the object user, $Q_i$ is the calorific value of the i-th gas source that provides natural gas to the object user, $A_i$ is the gas transmission ratio of the i-th gas source that provides natural gas to the object user, m is the total number of gas sources supplying natural gas to the object user.

Step 750, determining the natural gas energy measurement data of the object user based on the calorific value of the mixed natural gas and a gas consumption volume of the object user. In some embodiments, step 750 may be executed by the management platform.

In some embodiments, the management platform may determine the natural gas energy measuring data of the object user based on the product of the calorific value of the mixed natural gas and the gas consumption volume (also referred to as consumed gas volume) of the object user.

In some embodiments, according to the flow of a plurality of users in the natural gas transmission and distribution pipeline network, the natural gas pressure of the gas pressure detection node in the gas transmission route from each gas source to the object user, and the pipeline network topology data, the gas pressure of the natural gas provided to the object user by each gas source may be determined. A gas transmission ratio of each gas source to the object user may be determined based on the gas pressure of the natural gas provided by each gas source to the object user. A calorific value of mixed natural gas used by the object user may be determined based on the gas transmission ratio of each gas source to the object user. The natural gas energy measurement data of the object user may be determined based on the calorific value of the mixed natural gas and a gas consumption volume of the object user.

Figure 10:
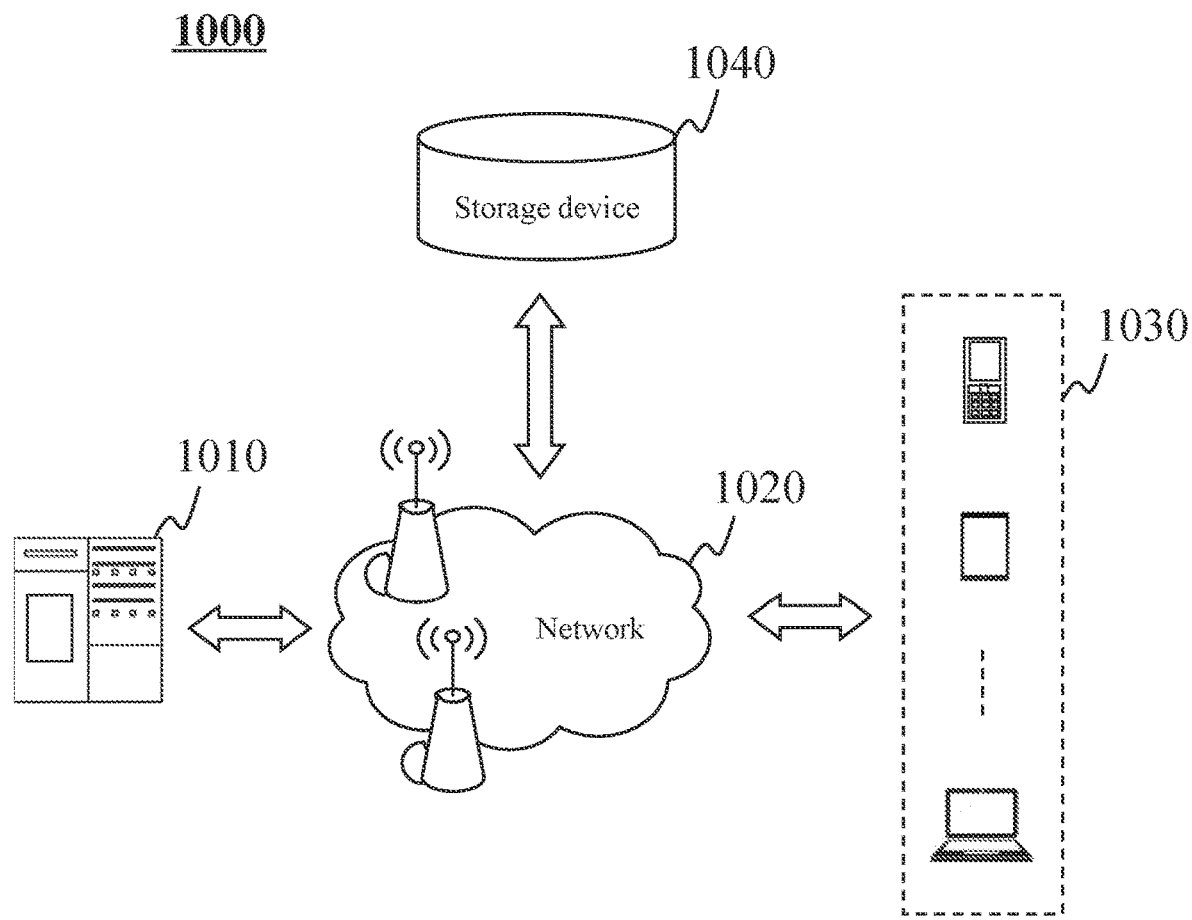
FIG. 10 is a schematic diagram of application scenario of systems for natural gas data computation outside gas IoT based on energy measuring according to some embodiments of the present disclosure.

FIG. 10 is a schematic diagram of the application scenario 1000 of the systems for natural gas data computation outside gas IoT based on energy measuring according to some embodiments of the present disclosure.

In some embodiments, the application scenario 1000 may include processing device 1010, network 1020, user terminal 1030, and storage device 1040. The application scenario 1000 may accurately measure consumed gas of a user by the method and/or process disclosed in this specification.

Processing device 1010 may be used to process data and/or information from at least one component or external data source (e.g., cloud data center) of the application scenario 1000. Processing device 1010 may access data and/or information from user terminal 1030 and/or storage device 1040 over network 1020. Processing device 1010 may directly connect to the user terminal 1030 and/or storage device 1040 to access information and/or data. For example, the processing device 1010 may obtain the features at a plurality of historical time points from the user terminal 1030 and/or storage device 1040. Processing device 1010 may process the acquired data and/or information. For example, the processing device 1010 may determine a plurality of gas sources supplied to the object user in the natural gas transmission and distribution pipeline network according to the flow of a plurality of users in the natural gas transmission and distribution pipeline network, the natural gas pressure of the gas pressure detection node in the gas transmission route from each gas source to the object user, and the pipeline network topology data; determine the gas pressure of the natural gas provided to the object user by each gas source; determine a gas transmission ratio of each gas source to the object user based on the gas pressure of the natural gas provided by each gas source to the object user; determine a calorific value of mixed natural gas used by the object user based on the gas transmission ratio of each gas source to the object user; and determine the natural gas energy measurement data of the object user based on the calorific value of the mixed natural gas and a gas consumption volume of the object user. In some embodiments, processing device 1010 may be a single server or server group. Processing device 1010 may be local, remote. Processing device 1010 may be implemented on the cloud platform.

Network 1020 may include any suitable network that provides information and/or data exchange capable of facilitating application scenario 1000. In some embodiments, one or more components of the application scenario 1000 (for example, processing device 1010, user terminal 1030, and/or storage device 1040) may exchange information and/or data over network 1020.

In some embodiments, the network 1020 may be any one or more of a wired network or a wireless network. In some embodiments, the network 1020 may include one or more network access points. For example, network 1020 may include wired or wireless network access points, for example, base stations and/or network exchange points, through which one or more components of application scenario 1000 may connect to network 1020 to exchange data and/or information.

User terminal 1030 refers to one or more terminals or software used by the user. In some embodiments, the user terminal 1030 may include but is not limited to smartphones, tablet computers, knee-on computers, desktop computers, etc. In some embodiments, the user terminal 1030 may interact with other components in the application scenario 1000 through the network 1020. For example, the user terminal 1030 may send one or more control instructions to the processing device 1010 to control the processing device 1010 to determine the natural gas energy measuring data of the object user. For example, the user terminal 1030 may obtain the natural gas energy measuring data of the object user determined by the processing device 1010.

Storage device 1040 may be used to store data, instructions, and/or any other information. In some embodiments, the storage device 1040 may store data and/or information obtained from processing device 1010 and/or user terminal 1030. For example, storage device 1040 may store information about a plurality of gas sources supplied to the object user in the natural gas transmission and distribution pipeline network. For another example, storage device 1040 may store training models that have been trained. In some embodiments, the storage device 1040 may include large-capacity memory, removable memory, etc. or the like, or any combination thereof.

It should be noted that the application scenario 1000 is only provided for the purpose of explanation, and does not intend to limit the scope of this manual. For ordinary technical personnel in the art, modifications or changes may be made according to the description of this disclosure. For example, application scenario 1000 may also include databases. However, these changes and modifications may not deviate from the scope of this disclosure.

Figure 11:
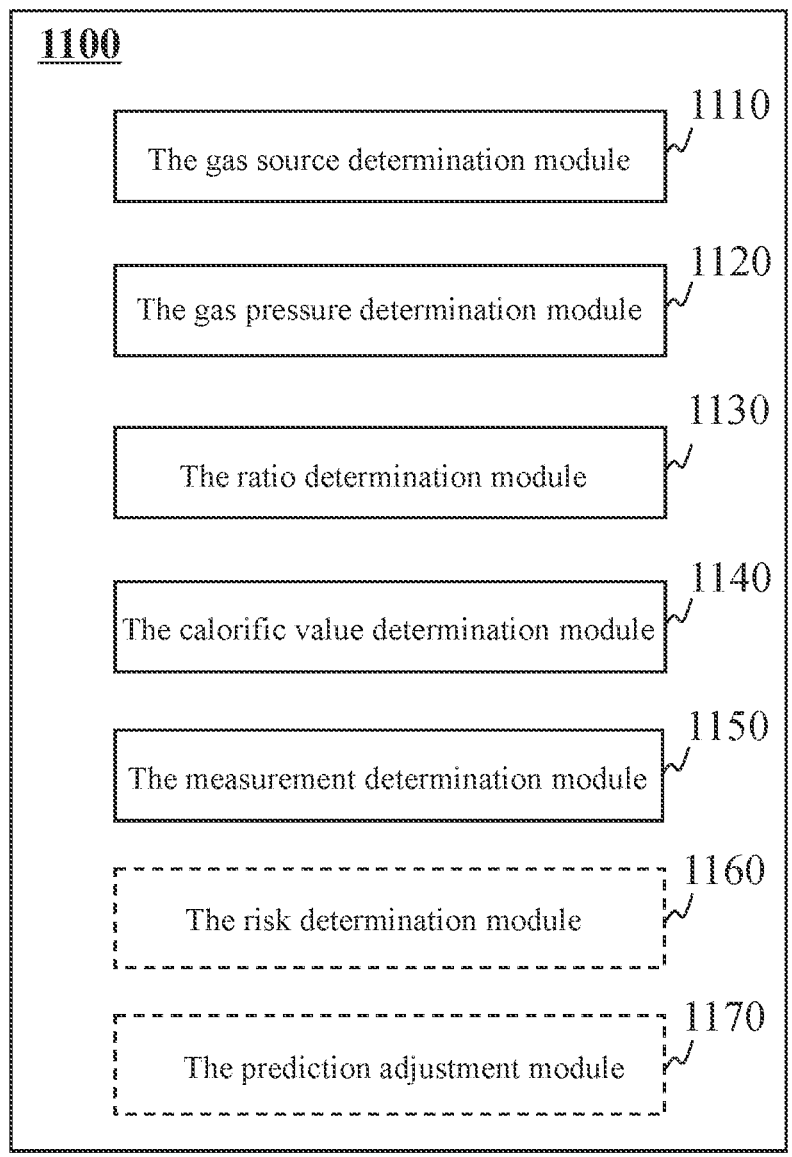
FIG. 11 is an exemplary block diagram of systems for natural gas data computation outside gas IoT based on energy measuring according to some embodiments of the present disclosure.

FIG. 11 is an exemplary block diagram of the system 1100 for natural gas data computation outside gas IoT based on energy measuring according to some embodiments of the present disclosure.

In some embodiments, the system 1100 for natural gas data computation outside gas IoT based on energy measuring may include the gas source determination module 1110, the gas pressure determination module 1120, the ratio determination module 1130, the calorific value determination module 1140, and the measurement determination module 1150.

The gas source determination module 1110 may be used to determine a plurality of gas sources supplied to the object user in the natural gas transmission and distribution pipeline network.

The gas pressure determination module 1120 may be used to determine the gas pressure of the natural gas provided to the object user by each gas source according to the flow of a plurality of users in the natural gas transmission and distribution pipeline network, the natural gas pressure of the gas pressure detection node in the gas transmission route from each gas source to the object user, and the pipeline network topology data.

In some embodiments, the gas pressure determination module 1120 may also be used to: for each gas source, determine the gas transmission route between the gas source and the object user, wherein the gas transmission route is a route from the object gas pressure detection node between the gas source and the object user to the object user; obtain the gas transmission feature vector of the gas transmission route according to the flow of a plurality of users in the natural gas transport network, the natural gas pressure (also referred to as gas pressure of the natural gas) of the object gas pressure detection node, the pipeline network topology data; and obtain the gas pressure of the natural gas supplied by the gas source to the object user through the gas pressure prediction model based on the gas transmission feature vector of the gas transmission route.

In some embodiments, the gas transmission route may be composed of at least one natural gas pipeline, and the gas transmission feature vector of the gas transmission route may be composed of a pipeline feature vector of at least one natural gas pipeline. The gas pressure determination module 1120 also may be used for obtaining the feature vector sequence by sorting the at least one pipeline feature vector of at least one pipeline according to the gas transmission sequence, and obtaining the gas pressure of the natural gas supplied by the gas source to the object user through the gas pressure prediction model based on the feature vector sequence.

In some embodiments, the gas pressure determination module 1120 also may be used for determining the gas transmission ratio of each gas source to the object user based on the gas pressure of the natural gas provided by each gas source to the object user and a diameter of a gas transmission route corresponding to each gas source.

The ratio determination module 1130 may be used to determine a gas transmission ratio of each gas source to the object user based on the gas pressure of the natural gas provided by each gas source to the object user.

The calorific value determination module 1140 may be used to determine a calorific value of mixed natural gas used by the object user based on the gas transmission ratio of each gas source to the object user.

The measurement determination module 1150 may be used to determine the natural gas energy measurement data of the object user based on the calorific value of the mixed natural gas and a gas consumption volume of the object user.

In some embodiments, systems 1100 for out-of-network computing of gas data based on energy measuring may further include a risk determination module 1160 for obtaining the measured value of gas pressure of the natural gas provided by the gas source to the object user; determining the failure risk of the gas source based on the measured value of the gas pressure of the natural gas of the gas source and the gas pressure of the natural gas provided to the object user by the gas source obtained through the gas pressure prediction model.

In some embodiments, systems for out-of-network computing of gas data based on energy measuring 1100 may also include the prediction adjustment module 1170 for obtaining the measured value of gas pressure of the natural gas provided by at least one gas source to the object user; adjusting the gas pressure of the natural gas provided by at least one gas source to the object user obtained by the gas pressure prediction model based on the measured value of gas pressure of the natural gas provided by at least one gas source to the object user.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for natural gas data computation outside a gas Internet of Things (IoT) based on energy measuring, comprising:
    establishing the gas IoT, the gas IoT including a user platform, a service platform, a management platform, a sensor network platform, and an object platform that sequentially interacts;
    obtaining, by the object platform, consumed gas volume data of a smart gas meter as first data, and sending it to the management platform through the sensor network platform;
    obtaining, by the object platform, location data of the smart gas meter as second data, and sending it to the management platform through the sensor network platform;
    perceiving, by the sensor network platform, the consumed gas volume data of the smart gas meter obtained by the object platform as the first data and sending, by the sensor network platform, the consumed gas volume data to the management platform;

perceiving, by the sensor network platform, the location data of the smart gas meter obtained by the object platform as the second data and sending, by the sensor network platform, the location data to the management platform; wherein
the management platform is set on a cloud platform to form a cloud platform in the gas IoT; and
a plurality of the cloud platforms in the gas IoT interact with at least one cloud platform outside the gas IoT, and computation outside the gas IoT is performed through the cloud platform outside the gas IoT;
generating, by the management platform, consumed gas preprocessing data based on the first data and the second data, and generating energy measurement data after performing the computation outside the gas IoT on the consumed gas preprocessing data by the cloud platform outside the gas IoT; and
sending, by the management platform, the energy measurement data to the user platform configured in a regional pipeline network center through the service platform; and
performing, by the user platform, gas energy measurement of the smart gas meter based on the energy measurement data
wherein the forming the cloud platform in the gas IoT further includes:
establishing a service platform A, a management platform A and a sensor network platform A on the cloud platform in the gas IoT; and
establishing a user platform A and an object platform A on two platforms which interact on the cloud platform in the gas IoT; wherein
the user platform A, the service platform A, the management platform A, the sensor network platform A, and the object platform A interact with each other in order, and the sensor network platform A perceives data of the object platform A and sends it to the management platform A; and
the management platform A performs computation processing on data of the object platform A and sends the processed data to the user platform A through the service platform A;
wherein a step that a plurality of the cloud platforms in the gas IoT interact with at least one cloud platform outside the gas IoT, and computation outside gas IoT is performed through the cloud platform outside the gas IoT further includes:
establishing a user platform B and an object platform B in the management platform A, and establishing a service platform B, a management platform B, and a sensor network platform B on the cloud platform outside the gas IoT; wherein
the user platform B, the service platform B, the management platform B, the sensor network platform B, and the object platform B interact in turn;
wherein the management platform A includes topology data of a local gas transmission and distribution pipeline network; and
the management platform A obtains a count of gas sources in the local gas transmission and distribution pipeline network corresponding to the second data according to the second data;
when the count of gas sources is greater than one, the management platform A obtains a gas supply pressure of each gas source corresponding to the second data as a first energy parameter and obtains a calorific value of each gas source corresponding to the second data as a second energy parameter; and
the management platform A is further configured to obtain, from the topology data of the local gas transmission and distribution pipeline network, gas transmission topology data of each gas source corresponding to the second data reaching the smart gas meter corresponding to the second data as a third energy parameter;
the management platform A sends the first energy parameter, the second energy parameter, and the third energy parameter to the management platform B through the sensor network platform B;
the management platform B obtains first energy measurement data by computing the first data based on the first energy parameter, the second energy parameter, and the third energy parameter, and sends it to the management platform A through the service platform B; and
the management platform A generates energy measurement data by processing the first energy measurement data.

2. The method for natural gas data computation outside a gas IoT based on energy measuring of claim 1, wherein the management platform B extracts a length of each branch from each gas source to the smart gas meter corresponding to the second data from the third energy parameter, and removes a branch whose length is greater than a preset value to form a gas supply length factor for each gas source;
the management platform B obtains a gas supply contribution value of each gas source contributing to the smart gas meter as first weight data according to the first energy parameter and the gas supply length factor matching the first energy parameter;
the management platform B uses the first weight data as a weight to perform a regression operation on the second energy parameter to generate a measuring heating parameter; and
the management platform B multiplies the measuring heating parameter with the first data to form the first energy measurement data.

3. A system for natural gas data computation outside a gas Internet of Things (IoT) based on energy measuring, comprising:
the gas IoT, the gas IoT including a user platform, a service platform, a management platform, a sensor network platform, and an object platform that sequentially interacts; wherein
the object platform obtains consumed gas volume data of a smart gas meter as first data, and sends it to the management platform through the sensor network platform;
the object platform obtains location data of the smart gas meter as second data, and sends it to the management platform through the sensor network platform;
the management platform is set on a cloud platform to form a cloud platform in the gas IoT; and
a plurality of the cloud platforms in the gas IoT interact with at least one cloud platform outside the gas IoT, and computation outside the gas IoT is performed through the cloud platform outside the gas IoT;
the management platform generates consumed gas preprocessing data based on the first data and the second data, and generates energy measurement data after performing the computation outside the gas IoT on the consumed gas preprocessing data by the cloud platform outside the gas IoT;

the management platform sends the energy measurement data to the user platform configured in a regional pipeline network center through the service platform; and the user platform performs gas energy measurement of the smart gas meter based on the energy measurement data;

a service platform A, a management platform A and a sensor network platform A are established on the cloud platform in the gas IoT; and a user platform A and an object platform A are established on the two platforms which interact on the cloud platform in the gas IoT;

the user platform A, the service platform A, the management platform A, the sensor network platform A, and the object platform A interact with each other in order, and the sensor network platform A perceives data of the object platform A and sends it to the management platform A; and the management platform A performs computation processing on the data of the object platform A and sends it to the user platform A through the service platform A;

a user platform B and an object platform B are established in the management platform A, and a service platform B, a management platform B, and a sensor network platform B are established on the cloud platform outside the gas IoT; and the user platform B, the service platform B, the management platform B, the sensor network platform B, and the object platform B interact in turn;

the management platform A includes topology data of a local gas transmission and distribution pipeline network; and the management platform A obtains a count of gas sources in the local gas transmission and distribution pipeline network corresponding to the second data according to the second data;

when the count of gas sources is greater than one, the management platform A obtains a gas supply pressure of each gas source corresponding to the second data as a first energy parameter and obtains a calorific value of each gas source corresponding to the second data as a second energy parameter; and the management platform A is further configured to obtain, from the topology data of the local gas transmission and distribution pipeline network, gas transmission topology data of each gas source corresponding to the second data reaching the smart gas meter corresponding to the second data as a third energy parameter;

the management platform A sends first energy parameter, the second energy parameter, and the third energy parameter to the management platform B through the sensor network platform B;

the management platform B obtains the first energy measurement data by computing the first data based on the first energy parameter, the second energy parameter, and the third energy parameter, and sends it to the management platform A through the service platform B; and the management platform A generates energy measurement data by processing the first energy measurement data.

4. The system for natural gas data computation outside a gas IoT based on energy measuring of claim 3, wherein the management platform B extracts a length of each branch from each gas source to the smart gas meter corresponding to the second data from the third energy parameter, and removes a branch whose length is greater than a preset value to form a gas supply length factor for each gas source;

the management platform B obtains a gas supply contribution value of each gas source contributing to the smart gas meter as first weight data according to the first energy parameter and the gas supply length factor matching the first energy parameter;

the management platform B uses the first weight data as a weight to perform a regression operation on the second energy parameter to generate a measuring heating parameter; and the management platform B multiplies the measuring heating parameter with the first data to form the first energy measurement data.

* * * * *